United States Patent
Itagaki et al.

(10) Patent No.: US 7,676,080 B2
(45) Date of Patent: Mar. 9, 2010

(54) METHOD OF CREATING COLOR CHART FOR COLOR EVALUATION, AND INFORMATION PROCESSING APPARATUS THEREOF

(75) Inventors: Tomohisa Itagaki, Abiko (JP);
Nobuatsu Sasanuma, Abiko (JP);
Masami Tomita, Matsudo (JP); Toshio Saishoji, Fuchu (JP); Satoshi Takayama, Chofu (JP); Miyoko Hayashi, Fuchu (JP)

(73) Assignee: Canon Kabushiki Kaisha (JP)

( * ) Notice: Subject to any disclaimer, the term of this patent is extended or adjusted under 35 U.S.C. 154(b) by 652 days.

(21) Appl. No.: 11/671,451

(22) Filed: Feb. 5, 2007

(65) Prior Publication Data

US 2007/0183659 A1    Aug. 9, 2007

(30) Foreign Application Priority Data

Feb. 6, 2006    (JP) .............................. 2006-029003

(51) Int. Cl.
*G06K 9/00*    (2006.01)
*G03F 3/08*    (2006.01)
(52) U.S. Cl. ....................................... 382/162; 358/518
(58) Field of Classification Search ........................ None
See application file for complete search history.

(56) References Cited

U.S. PATENT DOCUMENTS

| | | | |
|---|---|---|---|
| 6,668,079 B2* | 12/2003 | Takemoto | 382/167 |
| 7,006,690 B1* | 2/2006 | Imura | 382/167 |
| 7,365,878 B2* | 4/2008 | Nakagawa | 358/1.9 |
| 2005/0122533 A1 | 6/2005 | Nakagawa | |

FOREIGN PATENT DOCUMENTS

| | | | |
|---|---|---|---|
| JP | 2003-125218 A | 4/2003 |
| JP | 2003-298862 A | 10/2003 |
| JP | 2004-282156 A | 10/2004 |

OTHER PUBLICATIONS

Office action issued in corresponding Japanese application No. 2006-029003, dated Jul. 25, 2008.

* cited by examiner

*Primary Examiner*—Charles Kim
(74) *Attorney, Agent, or Firm*—Rossi, Kimms & McDowell LLP

(57) ABSTRACT

There is provided a method of creating a color chart for color evaluation used in color evaluation, including: an obtaining step of obtaining standard color chart data corresponding to a standard color chart including a plurality of patches; a display step of displaying an evaluation target image on a display screen; a setting step of setting an area in the evaluation target image, which is used to create a color chart for color evaluation; a computing step of computing color element data which represent color features of an image within the set area based on image data of the set area; and a creating step of creating the color chart for color evaluation by extracting patch data corresponding to the computed color element data from the standard color chart data.

10 Claims, 22 Drawing Sheets

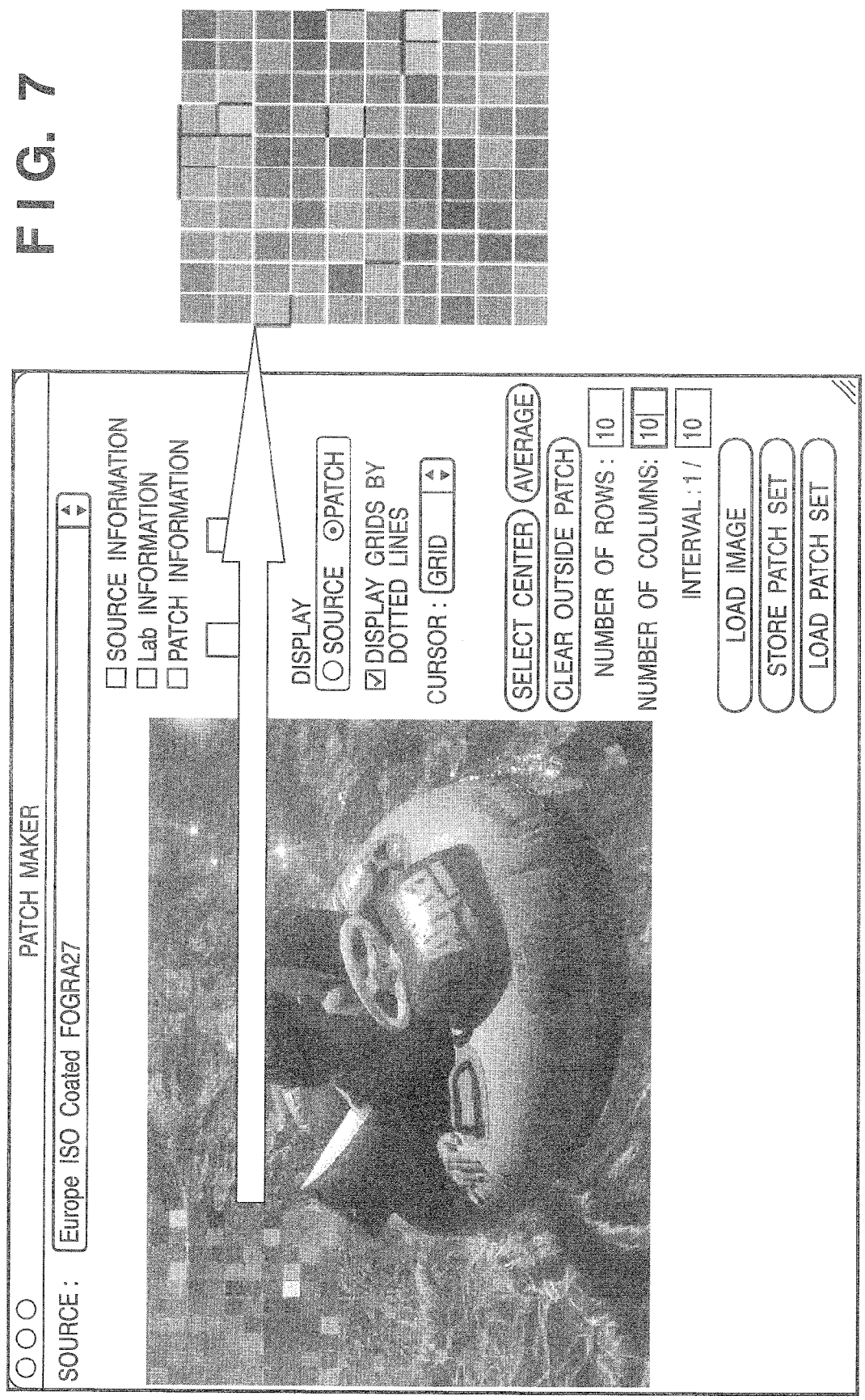

FIG. 9

| ID | CMYK_C | CMYK_M | CMYK_Y | CMYK_K |
|---|---|---|---|---|
| 1 | 77.9 | 79.5 | 65.2 | 91.5 |
| 2 | 78.9 | 81.6 | 65.8 | 92.4 |
| 3 | 75.9 | 79.2 | 65.9 | 91.3 |
| 4 | 75.5 | 78.5 | 67.2 | 91.0 |
| 5 | 74.2 | 76.2 | 66.7 | 90.0 |
| 6 | 77.3 | 78.7 | 67.0 | 91.1 |
| 7 | 75.1 | 77.8 | 65.3 | 90.7 |
| 8 | 76.0 | 78.2 | 65.5 | 90.9 |
| 9 | 68.5 | 71.0 | 62.5 | 87.5 |
| 10 | 69.3 | 72.2 | 63.2 | 88.1 |
| 11 | 69.8 | 73.4 | 63.4 | 88.6 |
| 12 | 73.3 | 73.9 | 58.4 | 88.9 |
| 13 | 77.5 | 80.3 | 61.0 | 91.8 |
| 14 | 70.9 | 74.9 | 61.4 | 89.4 |
| 15 | 70.1 | 74.0 | 64.8 | 88.9 |
| ... | ... | ... | ... | ... |
| ... | ... | ... | ... | ... |

FIG. 10A

| ID | CMYK_C | CMYK_M | CMYK_Y | CMYK_K | XYZ_X | XYZ_Y | XYZ_Z | LAB_L | LAB_A | LAB_B |
|----|--------|--------|--------|--------|-------|-------|-------|-------|-------|-------|
| 1A | 0 | 5 | 5 | 0 | 74.25 | 75.97 | 60.15 | 89.85 | 2.11 | 2.45 |
| 1B | 0 | 0 | 5 | 0 | 76.25 | 78.99 | 62.5 | 91.23 | 0.23 | 2.52 |
| 1C | 5 | 0 | 5 | 0 | 73.52 | 76.68 | 61.26 | 90.18 | −0.81 | 1.92 |
| 1D | 5 | 0 | 0 | 0 | 73.26 | 76.34 | 63.53 | 90.02 | −0.65 | −0.57 |
| 1E | 5 | 5 | 0 | 0 | 71.48 | 73.5 | 62.34 | 88.68 | 1.36 | −1.71 |
| 1F | 0 | 5 | 0 | 0 | 74.99 | 76.67 | 63.32 | 90.17 | 2.26 | −0.11 |
| 1G | 5 | 3 | 3 | 0 | 72.73 | 75.56 | 62.43 | 89.66 | −0.19 | −0.13 |
| 1H | 0 | 0 | 0 | 5 | 72.49 | 74.89 | 61.53 | 89.34 | 0.66 | 0.21 |
| 1I | 10 | 7 | 3 | 0 | 65.98 | 68.11 | 59.5 | 86.06 | 0.74 | −3.42 |
| 1J | 10 | 5 | 3 | 0 | 67.03 | 69.77 | 60.16 | 86.88 | −0.46 | −2.67 |
| 1K | 10 | 3 | 3 | 0 | 67.9 | 71.35 | 61 | 87.66 | −1.89 | −2.17 |
| 2A | 0 | 10 | 10 | 0 | 70.12 | 70.62 | 52.85 | 87.3 | 4.45 | 5.66 |
| 2B | 0 | 0 | 10 | 0 | 74.7 | 77.81 | 56.83 | 90.7 | −0.6 | 7.29 |
| 2C | 10 | 0 | 10 | 0 | 67.3 | 71.37 | 55.74 | 87.66 | −3.23 | 3.2 |
| 2D | 10 | 0 | 0 | 0 | 69.03 | 72.65 | 62.58 | 88.28 | −2.14 | −2.64 |
| 2E | 10 | 10 | 0 | 0 | 64.76 | 66.08 | 58.91 | 85.04 | 2.43 | 4.59 |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

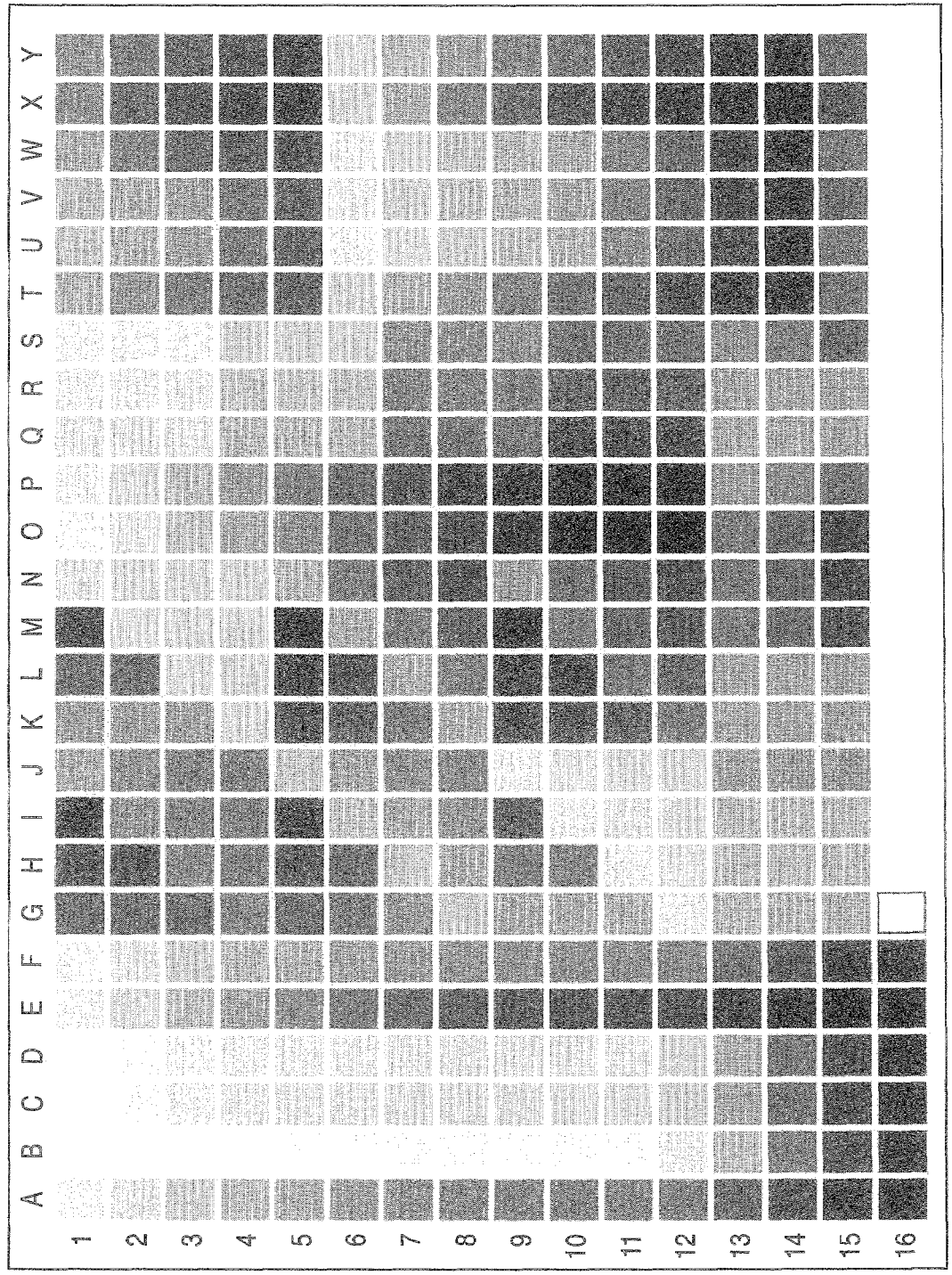

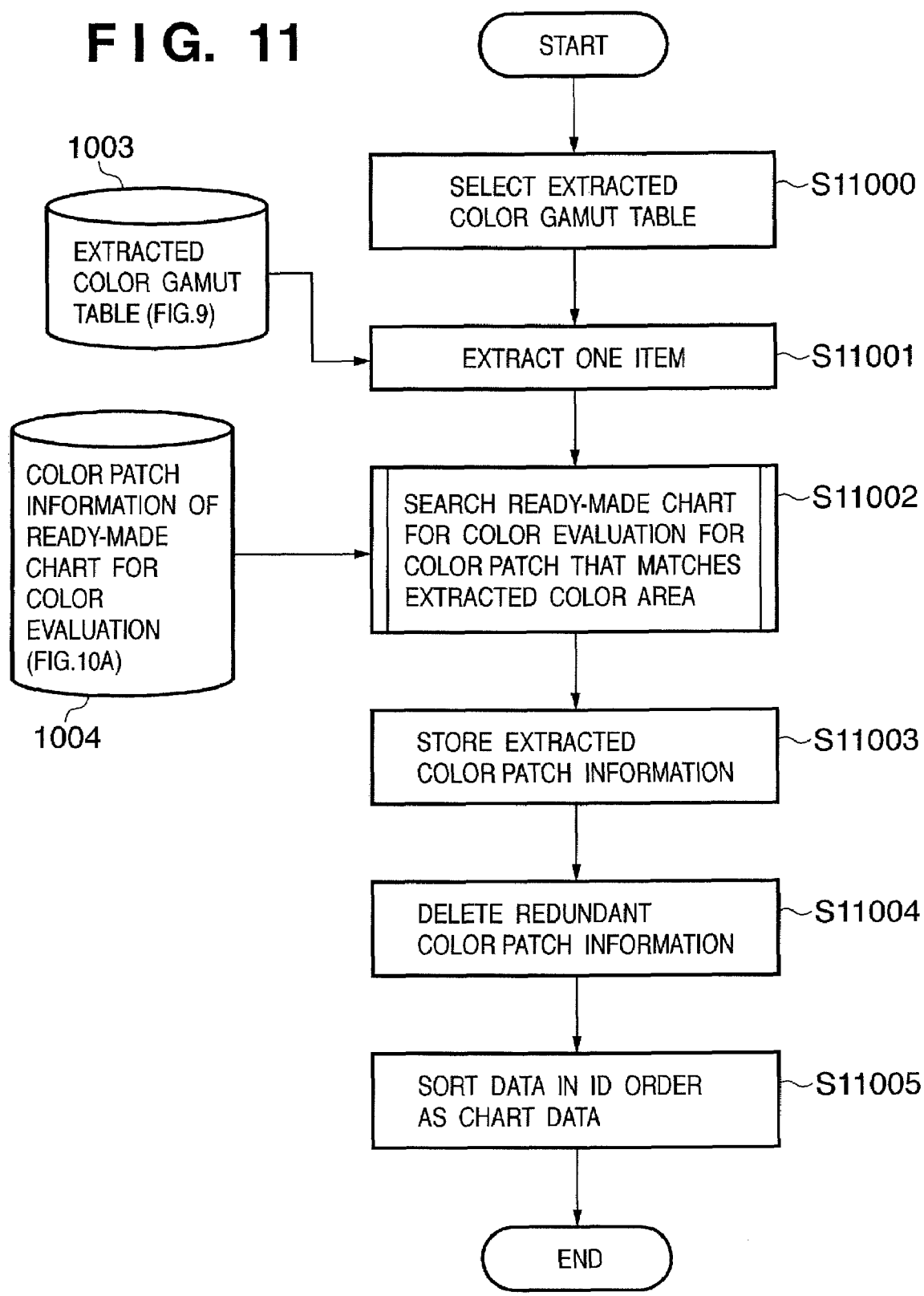

FIG. 13

| SAMPLE_ID | CMYK_C | CMYK_M | CMYK_Y | CMYK_K | XYZ_X | XYZ_Y | XYZ_Z | LAB_L | LAB_A | LAB_B |
|---|---|---|---|---|---|---|---|---|---|---|
| 1R | 10 | 5 | 3 | 0 | 67.03 | 69.77 | 60.16 | 86.88 | −0.46 | −2.67 |
| 1S | 10 | 3 | 3 | 0 | 67.9 | 71.35 | 61 | 87.66 | −1.89 | −2.17 |
| 2Q | 10 | 7 | 5 | 0 | 65.54 | 67.79 | 57.58 | 85.9 | 0.45 | −1.75 |
| 2R | 10 | 5 | 5 | 0 | 66.7 | 69.54 | 58.46 | 86.77 | −0.71 | −1.16 |
| 2S | 10 | 3 | 5 | 0 | 67.48 | 71.1 | 59.64 | 87.54 | −2.29 | −1.02 |
| 3Q | 10 | 7 | 7 | 0 | 65.41 | 67.86 | 56.17 | 85.94 | 0.01 | −0.23 |
| 3R | 10 | 5 | 7 | 0 | 66.62 | 69.67 | 57.08 | 86.83 | −1.16 | 0.37 |

FIG. 17

| SAMPLE_ID | CMYK_C | CMYK_M | CMYK_Y | CMYK_K | XYZ_X | XYZ_Y | XYZ_Z | LAB_L | LAB_A | LAB_B |
|---|---|---|---|---|---|---|---|---|---|---|
| 1O | 5 | 3 | 3 | 0 | 72.73 | 75.56 | 62.43 | 89.66 | −0.19 | −0.13 |
| 1P | 0 | 0 | 0 | 5 | 72.49 | 74.89 | 61.53 | 89.34 | 0.66 | 0.21 |
| 1Q | 10 | 7 | 3 | 0 | 65.98 | 68.11 | 59.5 | 86.06 | 0.74 | −3.42 |
| 1R | 10 | 5 | 3 | 0 | 67.03 | 69.77 | 60.16 | 86.88 | −0.46 | −2.67 |
| 1S | 10 | 3 | 3 | 0 | 67.9 | 71.35 | 61 | 87.66 | −1.89 | −2.17 |
| 2D | 10 | 0 | 0 | 0 | 69.03 | 72.65 | 62.58 | 88.28 | −2.14 | −2.64 |
| 2O | 10 | 7 | 7 | 0 | 65.41 | 67.89 | 56.15 | 85.95 | −0.04 | −0.19 |
| 2P | 0 | 0 | 0 | 10 | 65.85 | 68.06 | 56.1 | 86.04 | 0.57 | 0.02 |
| 2Q | 10 | 7 | 5 | 0 | 65.54 | 67.79 | 57.58 | 85.9 | 0.45 | −1.75 |
| 2R | 10 | 5 | 5 | 0 | 66.7 | 69.54 | 58.46 | 86.77 | −0.71 | −1.16 |
| 2S | 10 | 3 | 5 | 0 | 67.48 | 71.1 | 59.64 | 87.54 | −2.29 | −1.02 |
| 3D | 20 | 0 | 0 | 0 | 60.62 | 65.21 | 60.37 | 84.59 | −5.17 | −6.83 |
| 3O | 20 | 15 | 15 | 0 | 51.5 | 53.32 | 43.84 | 78.06 | 0.29 | 0.14 |
| 3P | 0 | 0 | 0 | 20 | 54.03 | 55.89 | 46.35 | 79.55 | 0.42 | −0.32 |
| 3Q | 10 | 7 | 7 | 0 | 65.41 | 67.86 | 56.17 | 85.94 | 0.01 | −0.23 |
| 3R | 10 | 5 | 7 | 0 | 66.62 | 69.67 | 57.08 | 86.83 | −1.16 | 0.37 |
| 3S | 10 | 3 | 7 | 0 | 67.61 | 71.49 | 58.36 | 87.72 | −2.83 | 0.6 |
| 6W | 15 | 5 | 5 | 0 | 62.03 | 65.2 | 57.2 | 84.59 | −1.88 | −3.63 |

F I G. 19
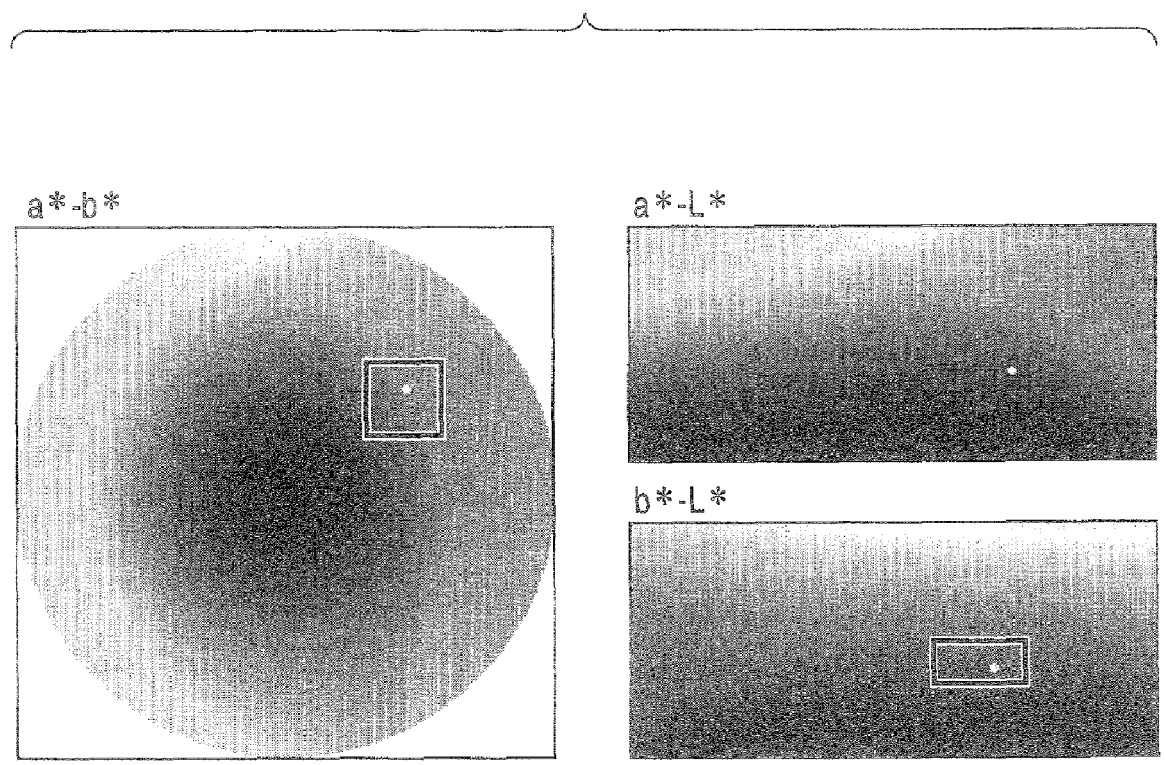

METHOD OF CREATING COLOR CHART FOR COLOR EVALUATION, AND INFORMATION PROCESSING APPARATUS THEREOF

BACKGROUND OF THE INVENTION

1. Field of the Invention

The present invention relates to a method of creating a color chart for color evaluation and an information processing apparatus thereof and, for example, to a method of generating a color chart for color evaluation, which is used upon making color reproduction evaluation of a printed material and the like and an information processing apparatus thereof.

2. Description of the Related Art

For example, conventional color evaluation of printed materials has been made using color charts specified by the International standards or industry associations, color charts uniquely developed by print companies, or the like. This color evaluation adopts a method: a chart which is prepared in advance is printed, the printed color patches undergo visual confirmation, or chromaticity measurement or density measurement using a spectrum color-difference meter or densitometer, thus examining if their values fall within a specified area. The color patch is a color image of a predetermined area used as a color sample of measurement target.

In this manner, the states of printers, ink densities, and the like are confirmed using color charts. As representative color charts used, for example, ISO12642 (IT8.7/3) or JMPA color patches (382 patches) are used. All these color charts are used upon evaluating color reproduction.

As a color evaluation technique, for example, Japanese Patent Laid-Open Nos. 2003-125218 and 2003-298862 have been proposed.

However, the above prior arts suffer various problems as follows.

Since a ready-made color chart for color evaluation is created for the purpose of covering the entire color space, the above measurement of color patches for color evaluation takes a very long time. For this reason, upon executing color evaluation by the conventional method when all colors need not be checked, colors which need not be checked undergo chromaticity measurement or density measurement to examine if their values falls within the specification area. Therefore, not only is a long measurement time required, but further time to check the measurement results is required as well.

When a ready-made color chart for color evaluation includes a large number of color patches, it is often impossible to print these color patches on a margin region of a printed material.

SUMMARY OF THE INVENTION

It is an object of the present invention to provide a method of creating a color chart for color evaluation, which easily creates a color chart for color evaluation in a short period of time within an evaluation range set by an evaluator, and an information processing apparatus thereof.

A creating method according to one aspect of the present invention is directed to a method of creating a color chart for color evaluation used in color evaluation, characterized by comprising: an obtaining step of obtaining standard color chart data corresponding to a standard color chart including a plurality of color patches used as a color sample; a display step of displaying an evaluation target image on a display screen; a setting step of setting an area in the evaluation target image, which is used to create a color chart for color evaluation; a computing step of computing color element data which represent color features of an image within the set area based on image data of the set area; and a creating step of creating the color chart for color evaluation by extracting color patch data corresponding to the computed color element data from the standard color chart data.

An information processing apparatus according to another aspect of the present invention is directed to an information processing apparatus for creating a color chart for color evaluation used in color evaluation, characterized by comprising: an obtaining unit adapted to obtain standard color chart data corresponding to a standard color chart including a plurality of color patches used as color sample; a display unit adapted to display an evaluation target image on a display screen; a setting unit adapted to set an area in the evaluation target image, which is used to create a color chart for color evaluation; a computing unit adapted to compute color element data which represent color features of an image within the set area based on image data of the set area; and a creating unit adapted to create the color chart for color evaluation by extracting color patch data corresponding to the computed color element data from the standard color chart data.

A control program according to still another aspect of the present invention is directed to a program for controlling an information processing apparatus for creating a color chart for color evaluation used in color evaluation, characterized by comprising: an obtaining step of obtaining standard color chart data corresponding to a standard color chart including a plurality of color patches used as a color sample; a display step of displaying an evaluation target image on a display screen; a setting step of setting an area in the evaluation target image, which is used to create a color chart for color evaluation; a computing step of computing color element data which represent color features of an image within the set area based on image data of the set area; and a creating step of creating the color chart for color evaluation by extracting color patch data corresponding to the computed color element data from the standard color chart data.

A storage medium according to yet another aspect of the present invention is characterized by storing the control program in a computer-readable format.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of the result after the data processing shown in FIG. 6B.

FIG. 9 shows an example of a color gamut table created by the data processing shown in FIG. 6B.

FIG. 10A shows an example of data of a ready-made standard color chart.

FIG. 10B shows an example of the ready-made standard color chart.

FIG. 11 is a flowchart for explaining processing for extracting color patches suited to a color gamut table of the selected area from the ready-made standard color chart according to the first embodiment.

FIG. 13 shows an example (first embodiment) of color chart data for color evaluation, which are extracted from the ready-made standard color chart by the color patch extraction processing.

FIG. 17 shows an example (second embodiment) of color chart data for color evaluation extracted from the ready-made standard color chart by the color patch extraction processing.

FIG. 19 shows a case wherein a chromaticity diagram is used as a source image used upon creating a color chart for color evaluation.

DESCRIPTION OF THE EMBODIMENTS

Figure 1:
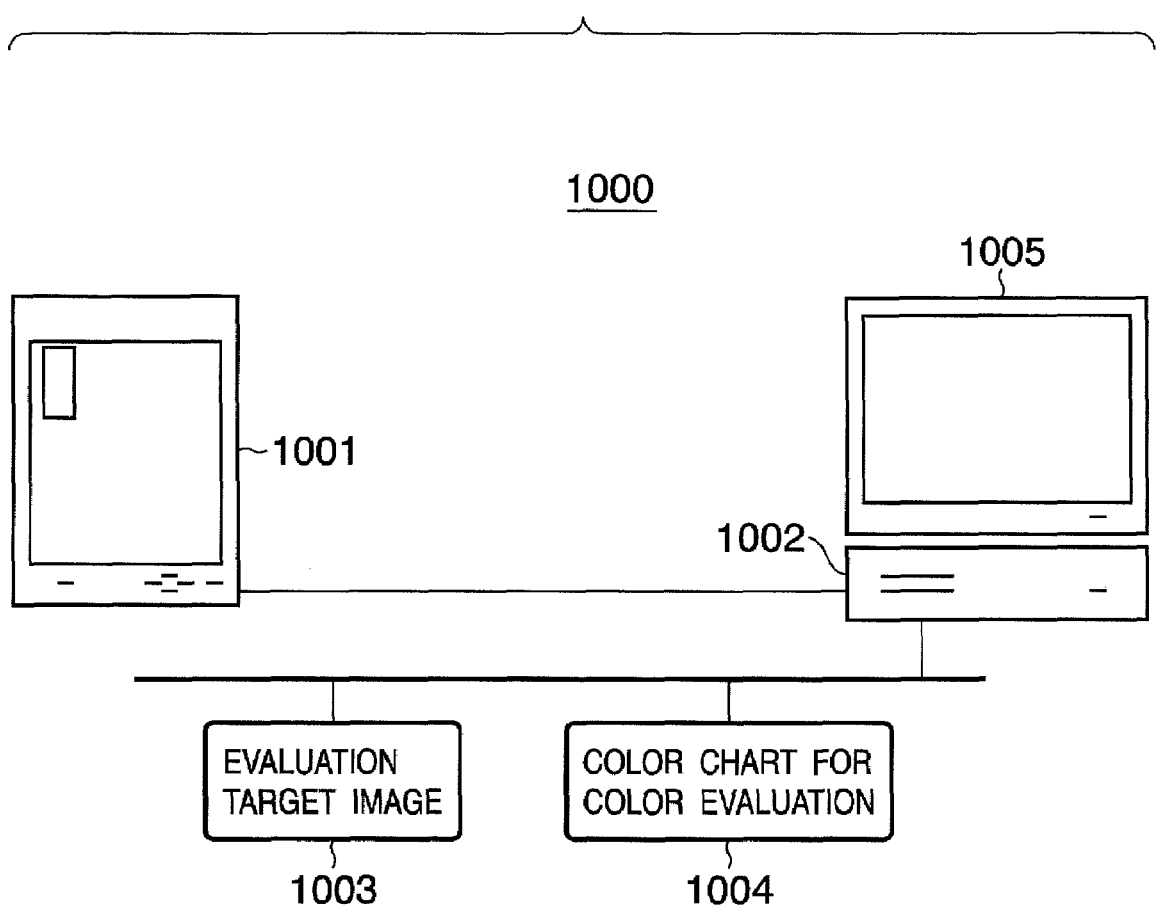
FIG. 1 is a diagram showing an example of the system arrangement of a creating apparatus of a color chart for color evaluation.

An apparatus for creating a color chart for color evaluation and a method of creating the color chart for color evaluation according to an embodiment of the present invention will be described in detail hereinafter with reference to the accompanying drawings. Note that this embodiment will explain examples of a setting region of an image which is to undergo color evaluation (evaluation target image) as a target for color evaluation (first and second embodiments) and a setting region of a chromaticity diagram (third embodiment as a source image used upon creating a color chart for color evaluation. However, an evaluator may use another image as a source image used upon creating a color chart for color evaluation or may change a method of setting a region based on a color evaluation chart for evaluation that the evaluator wants, and the present invention includes such modifications.

First Embodiment

[Feature]

In the method of creating a color chart for color evaluation, (1) an evaluation area in an image selected by the evaluator is divided into a desired number of divisions (e.g., the evaluation area is divided into m×n regions). Color elements (color elements (color element data) of the central pixels of the divided regions or the average values of color elements (color element data) of the divided regions) are extracted for respective divided regions to create a color gamut table. Next, (2) data of the created color gamut table are compared with a ready-made standard color chart to extract matching data (equal data) from the standard color chart. As a result, in the creating method of this embodiment, when not all colors need be checked like in a case wherein specific colors within the evaluation area of an image set by the evaluator are to undergo color evaluation and so forth, a required color chart for evaluation can be extracted from the ready-made standard color chart when it is used.

Therefore, using the color chart for color evaluation created by the creating method of this embodiment, the measurement time can be shortened compared to use of all color patches of the ready-made standard color chart. Therefore, color evaluation can be easily, quickly, and efficiently made.

In this embodiment, upon creating the color gamut table in the above process (1), a color gamut table can be appropriately created by a method suited to the selected area of the image. For example, when the colors of the image within the selected area fall within a very narrow color gamut, the evaluation area is divided to compute color elements of the divided regions. In this case, the color elements (color element data) at the central points of the respective regions are used. On the other hand, when various colors mix within the selected area of the evaluation target image although they belong to similar color systems, color elements (color element data) of the respective divided regions are computed to prevent a pixel having an outstanding color element (color element data) from being extracted. In this case, the color elements (color element data) of the average values of the respective regions are used. For this reason, by comparing the color gamut table appropriately created by the method suited to the image with the ready-made standard color chart data, only matching data can be easily and quickly extracted.

Example of Arrangement of Information Processing Apparatus according to Present Embodiment A description will be given of an example of the arrangement of a creating apparatus 1000 of a color chart for color evaluation according to the present embodiment with reference to the accompanying drawings.

[Creating Apparatus of Color Chart for Color Evaluation: FIG. 1]

FIG. 1 shows an example of the system arrangement of the creating apparatus 1000 of a color chart for color evaluation according to the present invention.

A screen on a display unit 1001 displays an automatically generated color chart for color evaluation. A main body (CPU) 1002 of the creating apparatus of a color chart for color evaluation displays an evaluation target image which is pre-stored in a storage medium 1003 on a display unit 1005.

Based on an image within an area, selected by the user, of the evaluation target image displayed on the display unit 1005, a standard color chart pre-stored in a storage medium 1004 is selected. A color chart for color evaluation created based on the selected standard color chart is stored in the storage medium 1004.

Figure 2:
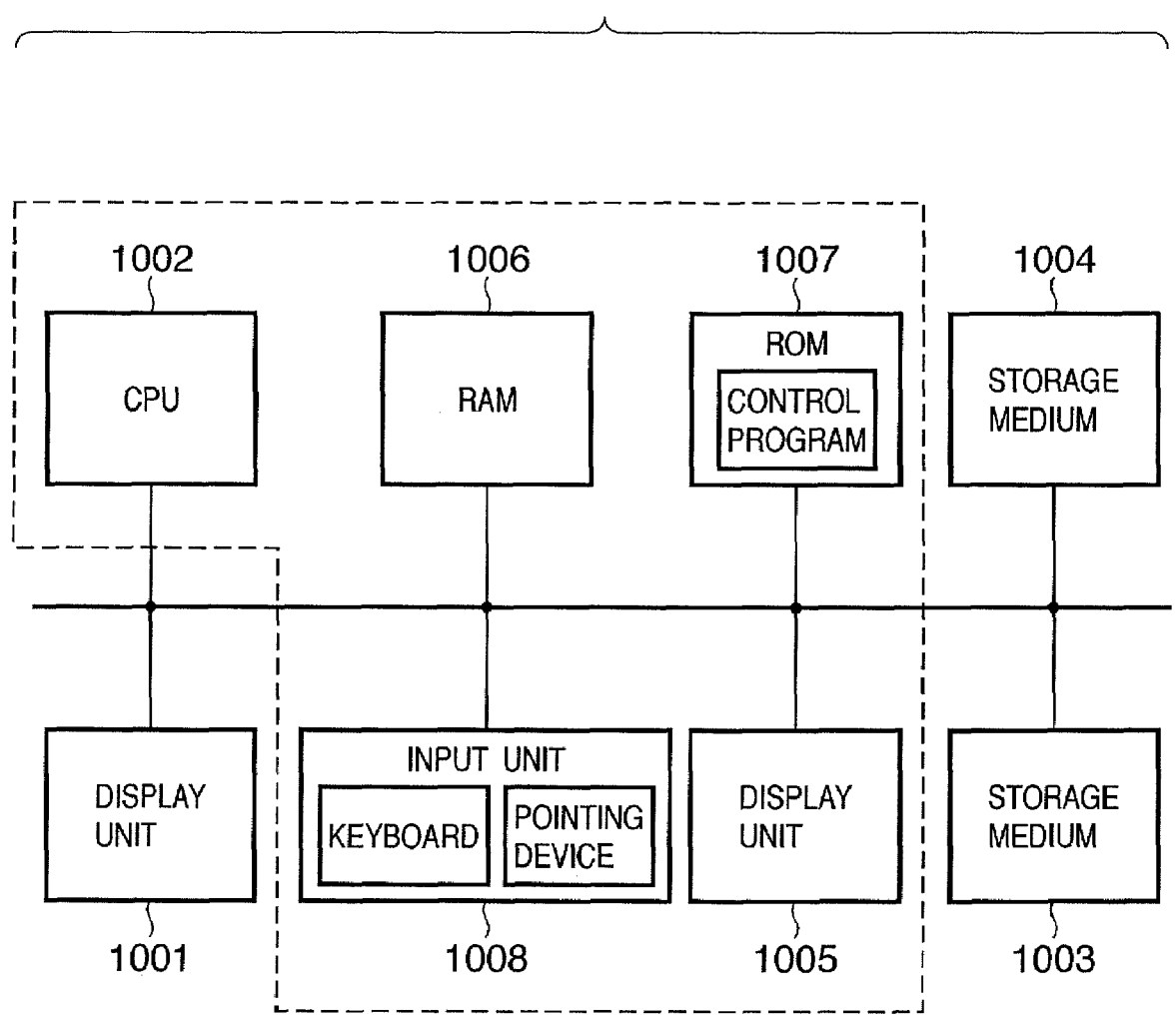
FIG. 2 is a block diagram for explaining the control arrangement of the creating apparatus of a color chart for color evaluation.

[Control Arrangement of Creating Apparatus of Color Chart for Color Evaluation: FIG. 2]

FIG. 2 is a block diagram for explaining an example of the arrangement of the creating apparatus 1000 of a color chart for color evaluation.

The CPU 1002 controls respective parts based on control programs stored in a ROM 1007 using a RAM 1006 as a work area so as to execute processing and the like to be described later. The CPU 1002 executes processing for creating a color gamut table, and extracting a color chart for color evaluation required for the created color gamut table from a ready-made standard color chart. An input unit 1008 includes a keyboard, mouse, pointing device, and the like, and is used when the evaluator selects an evaluation target image and a color evaluation area. Reference numeral 1005 denotes a display unit which displays an image which is stored in the storage medium 1003 and serves as a source upon creating a color chart for color evaluation. The screen on the display unit 1001 displays a color chart for color evaluation automatically generated by the creating apparatus 1000 of a color chart for color evaluation based on the standard color chart in the storage medium 1004.

Operation Example of Information Processing Apparatus in First Embodiment

The processing for creating the above color gamut table, and comparing data of the created color gamut table with the ready-made standard color chart to extract matching data from the ready-made standard color chart using the creating apparatus 1000 of a color chart for color evaluation will be described below.

Figure 3:
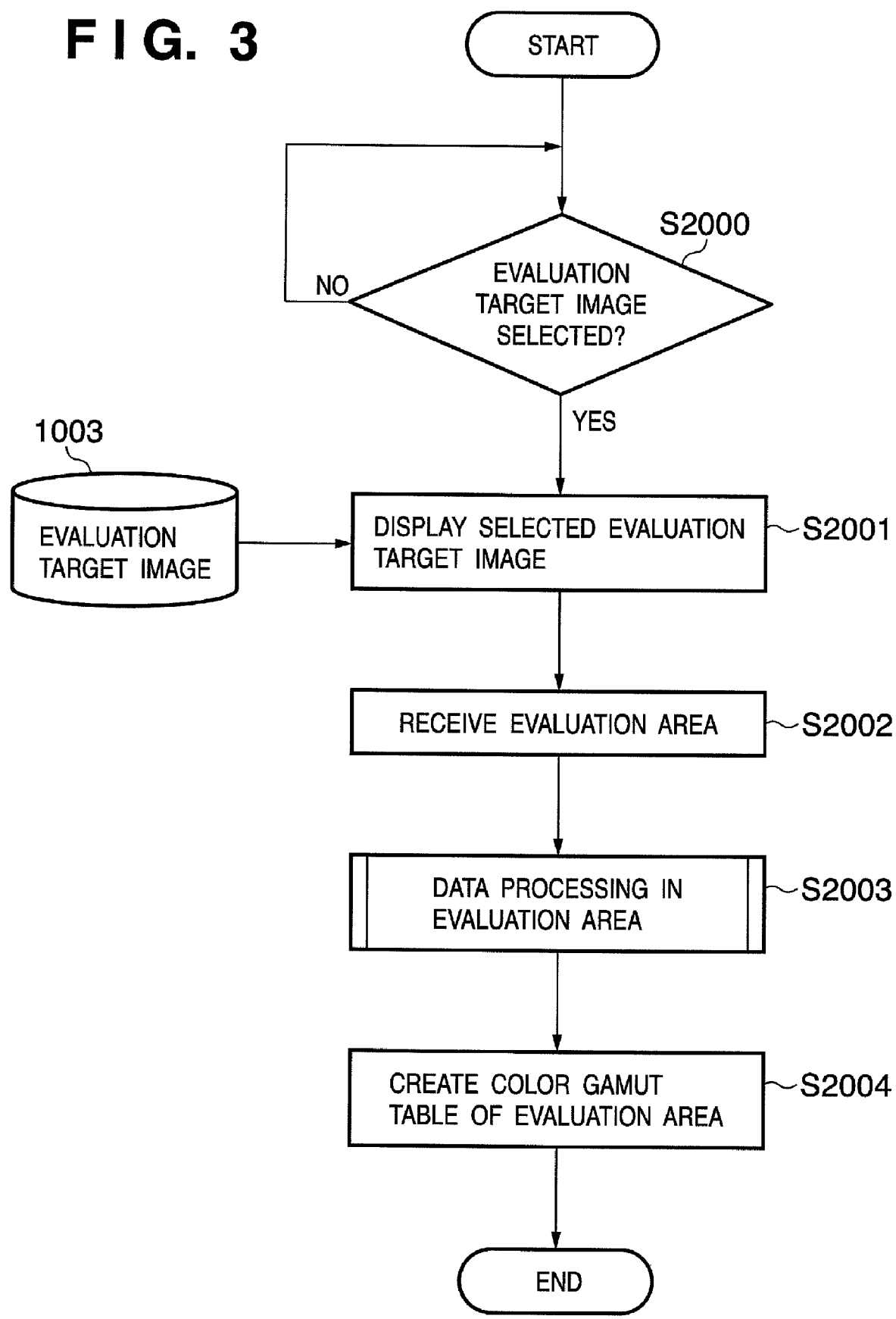
FIG. 3 is a flowchart for explaining processing for selecting a color evaluation area from an evaluation target image, and creating a color gamut table of the selected area.

[Creating Processing of Color Gamut Table: FIG. 3]

FIG. 3 is a flowchart for explaining the processing for creating a color gamut table of a color evaluation area selected by the evaluator from an evaluation target image using the creating apparatus 1000 of a color chart for color evaluation.

Note that the color gamut table stores an extraction result of a color gamut to be originally evaluated by the evaluator from the evaluation target image. Based on this color gamut table, a chart including color patches that match the area selected from the ready-made color chart for color evaluation can be extracted, as shown in FIG. 11.

The processing for creating a color gamut table of the selected area will be explained first using FIG. 3. In step S2000, the evaluator selects an evaluation target image to be evaluated from an evaluation target image group displayed on the display unit 1005.

In step S2001, the CPU 1002 reads out the selected evaluation target image from those pre-stored in the storage medium, and displays it on the display unit 1001. Note that the display method and selection method of the evaluation target image are not limited to the above methods, and known methods may be used.

Figure 4:
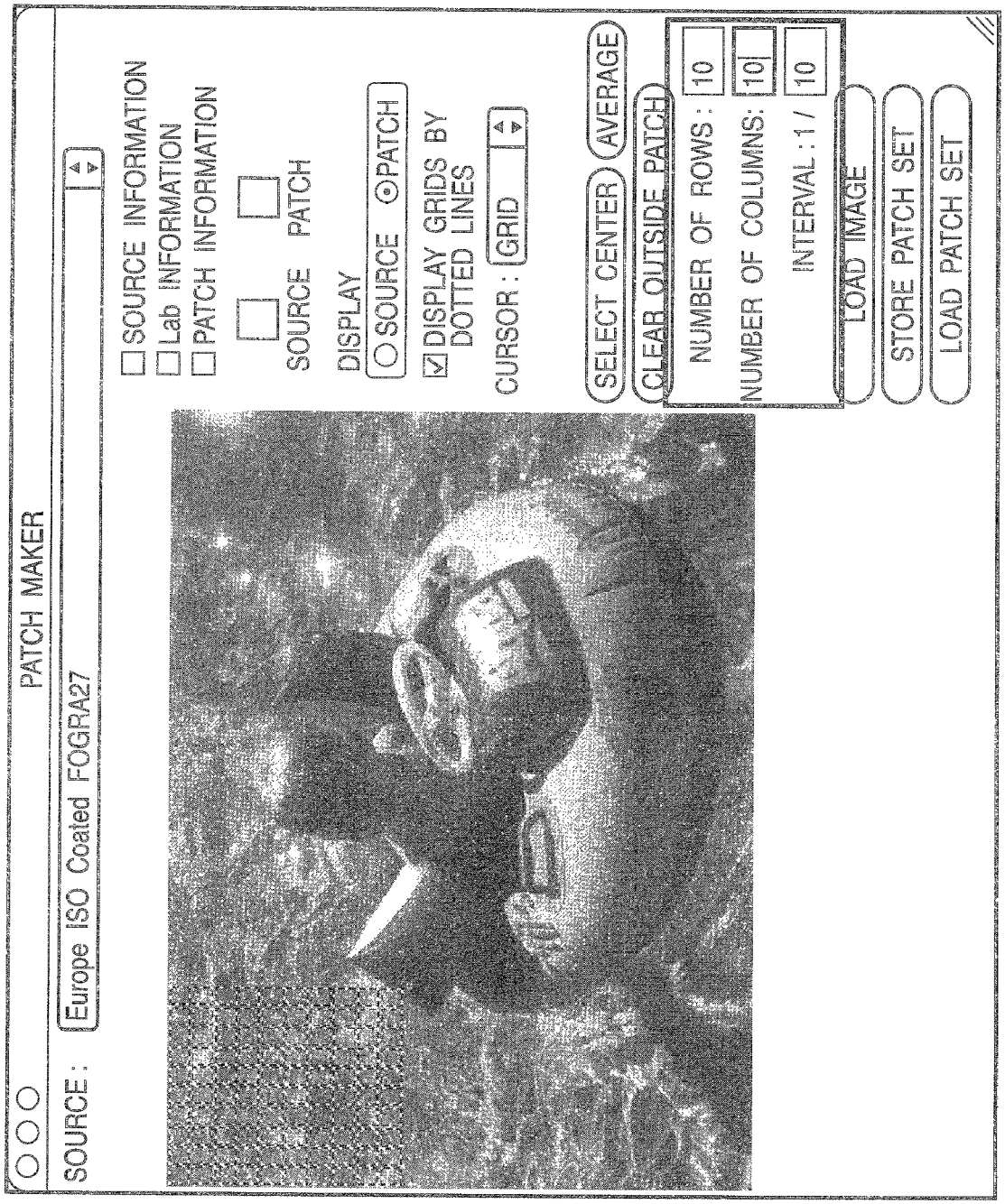
FIG. 4 is a view for explaining an example upon selection of the color evaluation area from the evaluation target image.

Next, in step S2002 the CPU 1002 receives the selection results of an evaluation area to be evaluated within the displayed evaluation target image and the number of divisions (m×n) by the evaluator using the pointing device. FIG. 4 shows an example of the selection result of the area which is to undergo color evaluation from the evaluation target image by the evaluator. A portion surrounded by an upper left rectangle on the evaluation target image displayed on the display unit 1001 shown in FIG. 4 is an area which is to undergo color evaluation. FIG. 4 displays edit boxes used to input the number of divisions (m×n) upon dividing this color evaluation area. FIG. 4 shows the result obtained when the evaluator inputs the number m of rows=10 and the number n of columns=10 in the edit boxes (upon dividing the area into 10×10).

In step S2003, the CPU 1002 applies data processing selected from three types of data processing in correspondence with the image selected by the evaluator to the evaluation target image within the selected area (evaluation area). In other words, the CPU 1002 selects the data processing according to the evaluation area (step S3000 in FIG. 5). Of the three types of data processing, the first data processing is processing (1) shown in step S4000 in FIG. 5, which uses color element data of all pixels of the evaluation area. The second data processing is processing (2) shown in step S5000, which divides the evaluation area into m×n regions and uses color element data of the central values of the divided regions. The third data processing is processing (3) shown in step S6000, which divides the evaluation area into m×n regions, and computes and uses color element data of the average values of the divided regions.

Finally, in step S2004 the CPU 1002 creates a color gamut table of the evaluation area obtained based on the data processing selected from the three types of data processing by the evaluator. In this way, the creating apparatus 1000 of a color chart for color evaluation of this embodiment can create a color gamut table suited to the evaluation target image area for the image area in the evaluation target image that the evaluator wants to evaluate.

The three types of processing in steps S4000, S5000, and S6000 in FIG. 5 described above will be described in detail below using FIGS. 6A to 9.

Figure 6A:
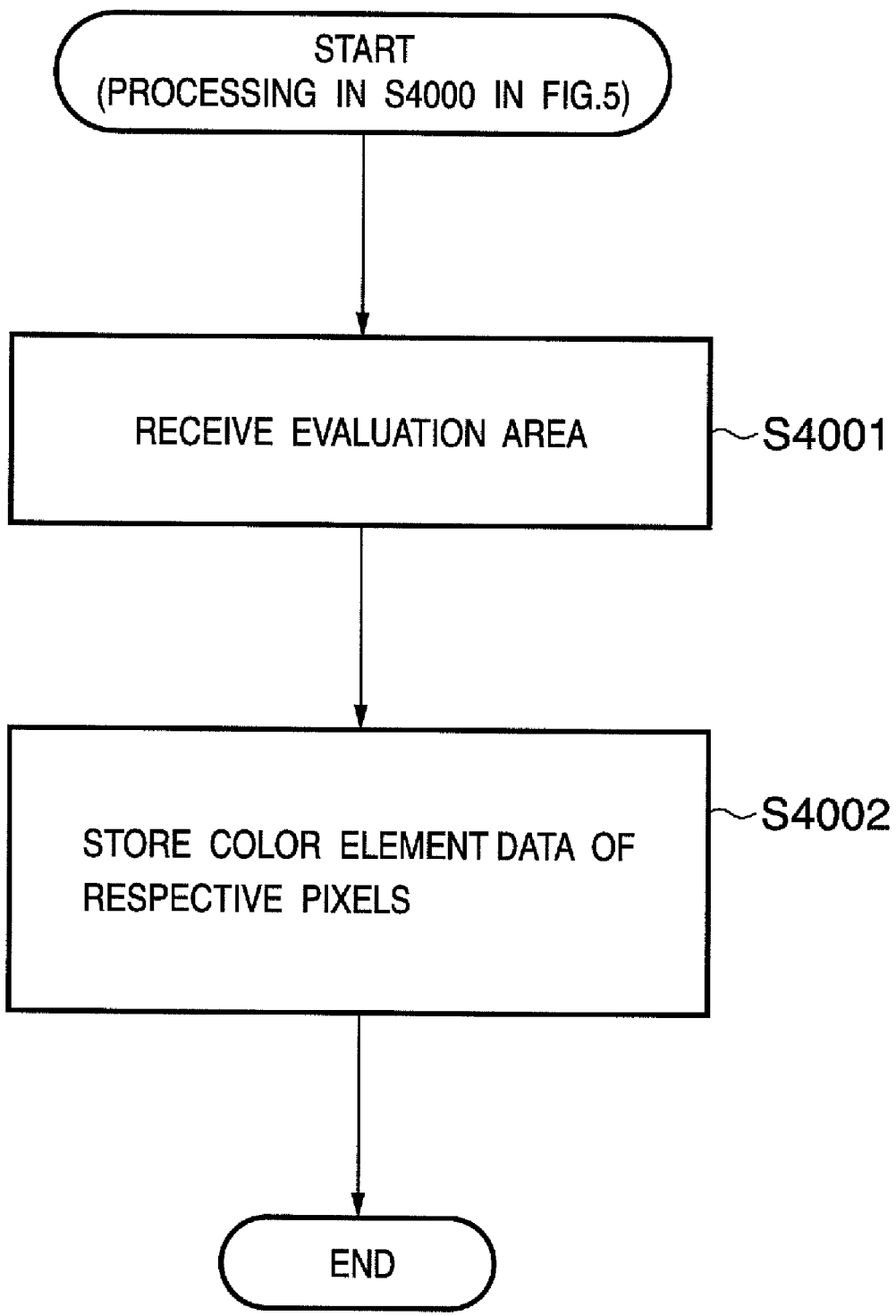
FIG. 6A is a flowchart for explaining processing upon recording color element data of all pixels as the data processing of the selected area.

[When Using Color Element Data of All Pixels of Evaluation Area (Selected Area): FIG. 6A]

Figure 5:
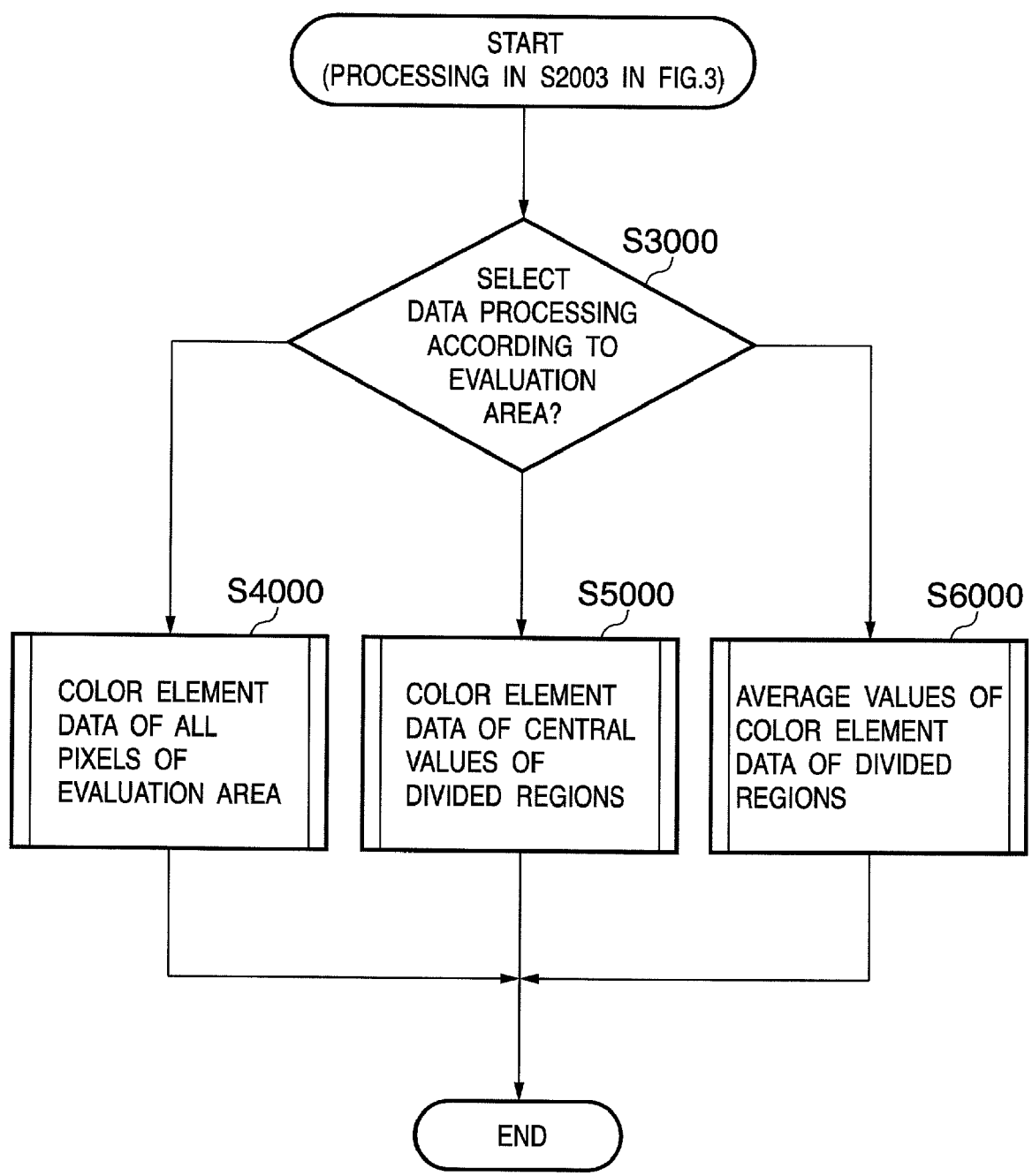
FIG. 5 is a flowchart for explaining data processing of the selected area.

FIG. 6A is a flowchart showing the processing in step S4000 in FIG. 5. This processing stores color element data values for all pixels of an image within an area selected using the pointing device in the storage medium. In this case, the color element data of all the pixels within the selected area are used. Note that such processing is effective when the generated color chart falls within a specific color gamut.

Referring to FIG. 6A, if the CPU 1002 detects in step S3000 in FIG. 5 that the evaluator has selected the first processing as the data processing, the process advances to step S4001, and the CPU 1002 receives the evaluation area selected by the evaluator. In step S4002, the CPU 1002 stores color element data of all the pixels included in the evaluation area selected by the evaluator.

Figure 6B:
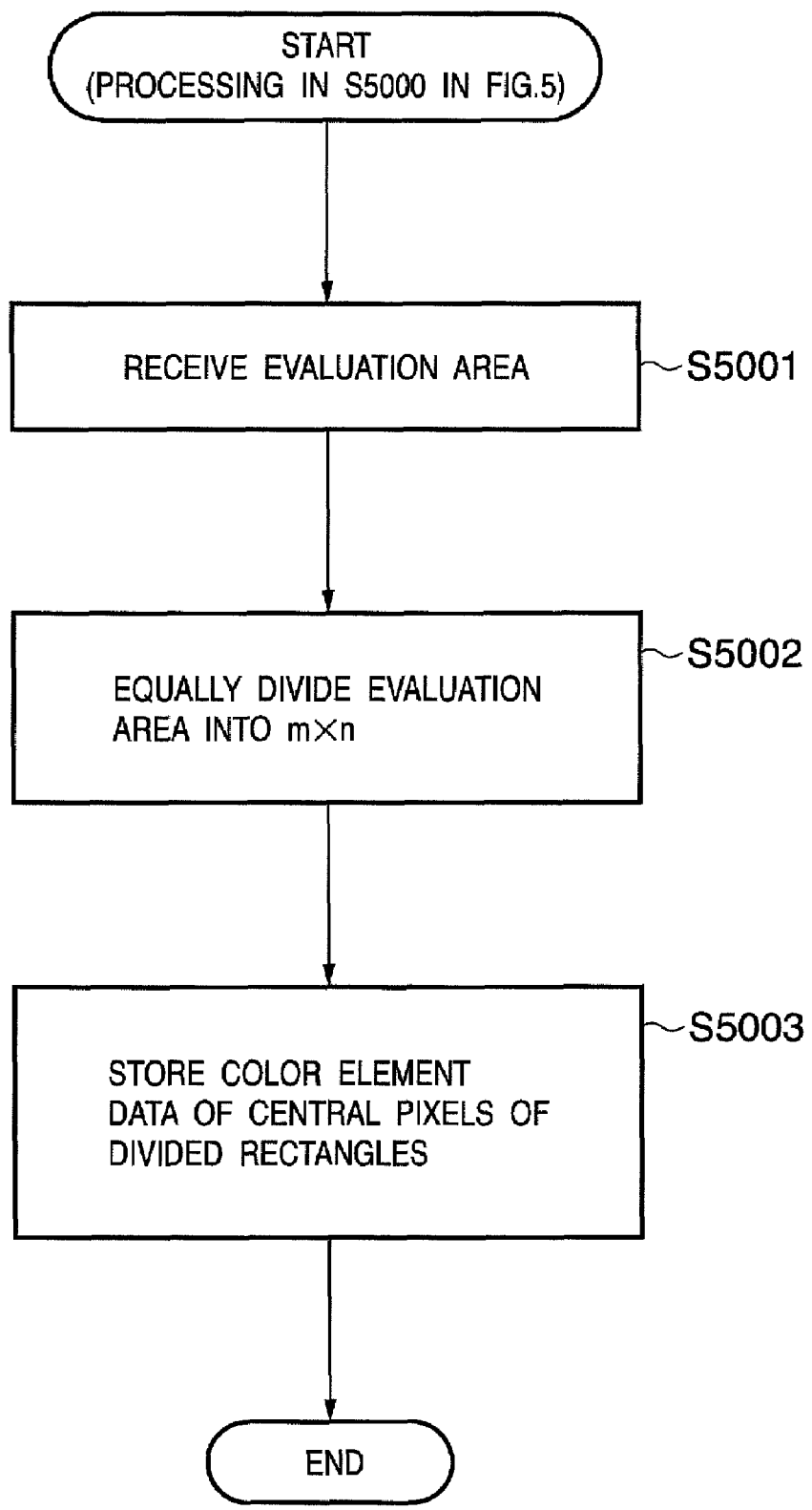
FIG. 6B is a flowchart for explaining processing upon dividing the selected area into m×n regions, and recording color element data of the central pixels of the divided regions as the data processing of the selected area.

[When Dividing Evaluation Area (Selected Area) and Using Color Element Data of Central Values of Divided Regions: FIG. 6B]

FIG. 6B is a flowchart showing the processing in step S5000 in FIG. 5. This processing equally divides the area selected using the pointing device into m×n regions, and adopts pixels at the central points of the divided rectangular areas as representative values of these divided regions. Then, the processing stores the color element data values of the pixels at the central points in the storage medium. Such processing can reduce the number of data compared to that shown in FIG. 6A.

Referring to FIG. 6B, if the CPU 1002 detects that the evaluator has selected the second processing as the data processing, the process advances to step S5001, and the CPU 1002 receives the evaluation area and the number of divisions (m×n: e.g., 10×10) selected by the evaluator.

In step S5002, the CPU 1002 divides the evaluation area selected by the evaluator into regions as many as the number of divisions (m×n: e.g., 10×10). In step S5003, the CPU 1002 stores color element data of pixels at the centers of the respective divided rectangles as color gamut table data (m×n: e.g., 10×10).

FIG. 9 shows an example of the stored color gamut table data (10×10). FIG. 7 shows the display state of the color gamut table on the display unit 1001 based on the evaluation area of the image selected by the evaluator and the computed color gamut table data. The right side of FIG. 7 shows the result of the data processing (color element data at the central pixels of respective rectangles) within the area selected by the evaluator.

Note that this embodiment shows an example of device-dependent CMYK data (device color data), as shown in FIG. 9. "ID" in FIG. 9 is the number which indicates the m×n divided regions in turn. "CMYK_C" in FIG. 9 indicates the extracted cyan value; "CMYK_M", the magenta value; "CMYK_Y", the yellow value; and "CMYK_K", the black value. Using the color gamut table, required color patches can be extracted from a ready-made standard color chart, as will be described later using FIG. 11.

Figure 6C:
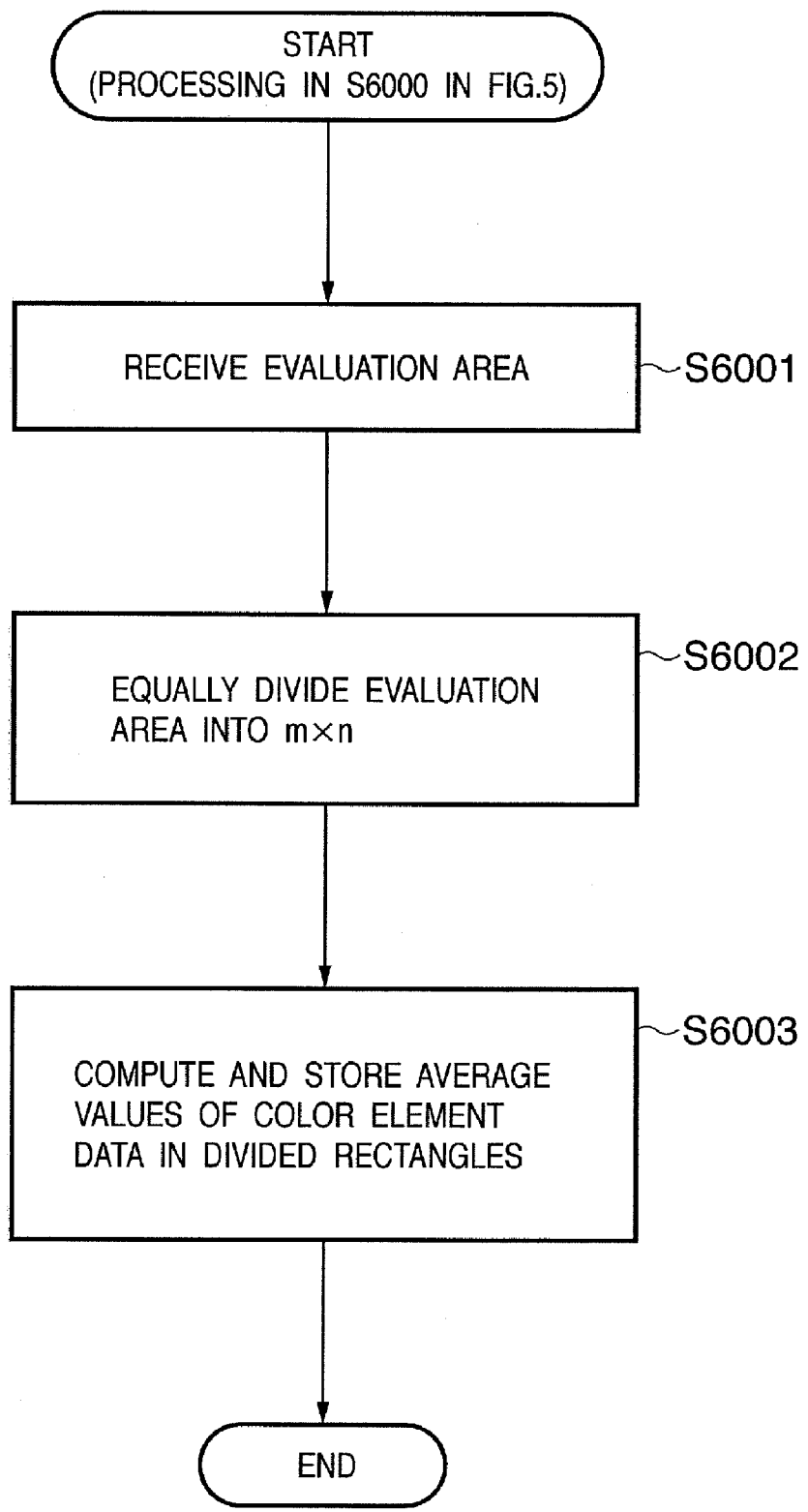
FIG. 6C is a flowchart for explaining processing upon dividing the selected area into m×n regions, and recording the average values of color element data of the divided regions as the data processing of the selected area.

[When Dividing Evaluation Area (Selected Area) and Using Color Element Data of Average Values of Divided Regions: FIG. 6C]

FIG. 6C is a flowchart showing the processing in step S6000 in FIG. 5. This processing equally divides the area selected using the pointing device into m×n regions, and computes the average values of color element data of all pixels included in the respective divided rectangular areas. The processing then stores the computed values as color element data of these regions in the storage medium. This processing can reduce the number of data compared to that shown in FIG. 6A.

Referring to FIG. 6C, if the CPU 1002 detects that the evaluator has selected the third processing as the data processing, the process advances to step S6001, and the CPU 1002 receives the evaluation area and the number of divisions (m×n: e.g., 10×10) selected by the evaluator.

In step S6002, the CPU 1002 divides the evaluation area selected by the evaluator into regions as many as the number of divisions (m×n: e.g., 10×10). In step S6003, the CPU 1002 computes the average values of color element data of respective pixels included in the divided rectangles, and stores them as color gamut table data (m×n: e.g., 10×10). Note that the drawing of the computed color gamut table data (10×10) will be omitted, but it is similar to FIG. 9.

Figure 8:
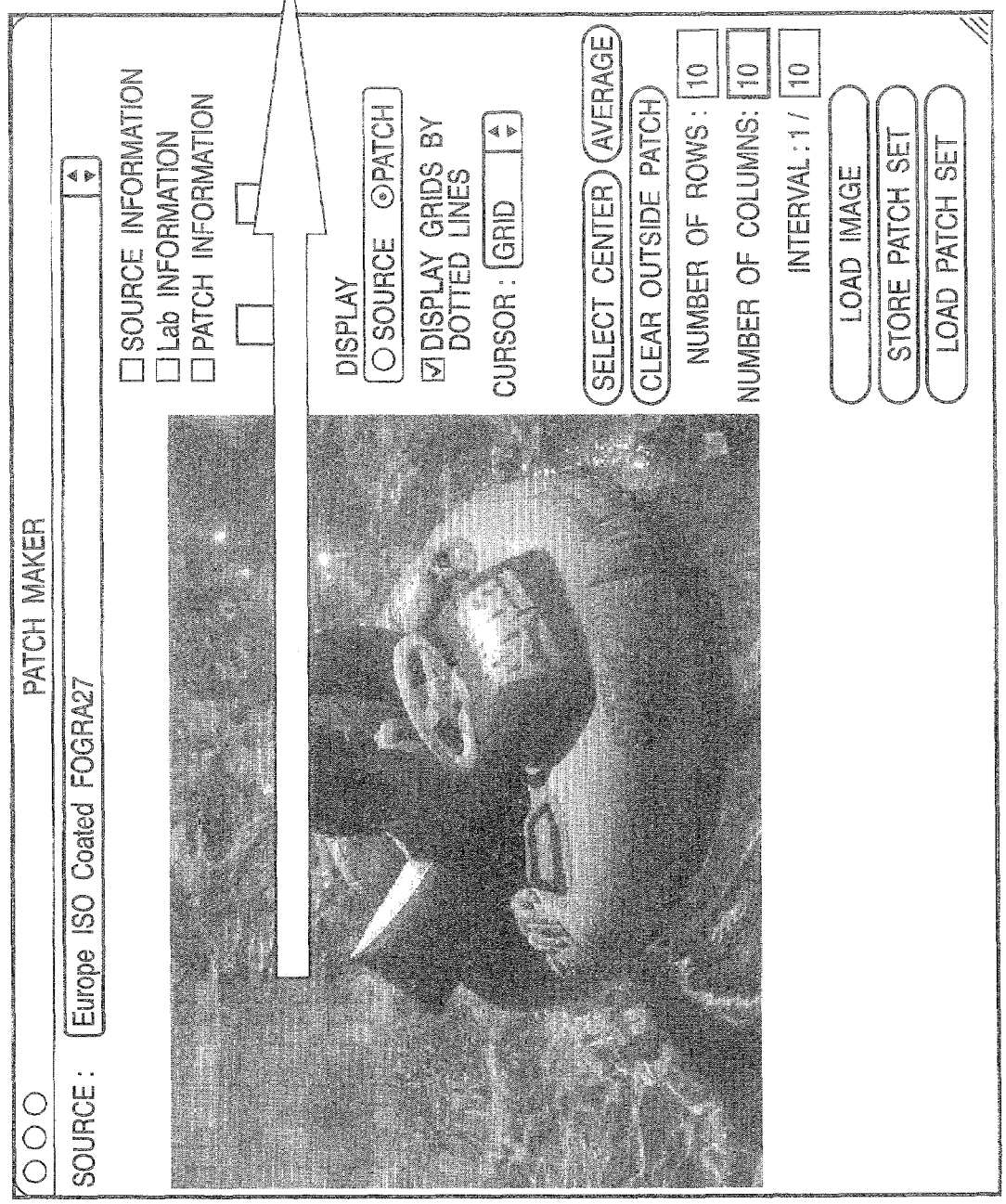
FIG. 8 shows an example of the result after the data processing shown in FIG. 6C.

FIG. 8 shows the display state of the color gamut table on the display unit 1001 based on the evaluation area of the image selected by the evaluator and the computed color gamut table data. The right side of FIG. 8 shows the result of the data processing (color element data of the average values of pixels in respective rectangles) within the area selected by the evaluator.

One of the three types of data processing described above computes the color gamut table data suited to the evaluation area of the evaluation target image selected by the evaluator.

[Creating Processing of Color Chart: FIG. 11]

The processing for extracting a color chart for color evaluation suited to the color gamut table of the evaluation area selected by the evaluator, which table is obtained by the processing shown in FIG. 3), from a ready-made color chart for color evaluation will be described below with reference to FIG. 11.

FIG. 10A shows data of JMPA color patches (382 patches) as an example of the ready-made standard color chart. FIG. 10B shows the JMPA color patches (382 patches) as the basis of FIG. 10A. As shown in FIG. 10A, the ready-made standard color chart includes device colors, data on XYZ and L*a*b* spaces as absolute chromaticity diagrams which specify these device colors, and the like. This is because the device colors depend on models and inks and the absolute chromaticity diagrams are indispensable.

The processing for extracting color patches having values near the device colors used in the selected area of the evaluation target image selected by the evaluator from the ready-made standard color chart will be described below using FIG. 11.

In step S11000, the CPU 1002 selects the extracted color gamut table (created in FIG. 3).

In step S11001, the CPU 1002 extracts one item (e.g., ID1) of the color element data values stored, as shown in FIG. 9, from the extracted color gamut table.

In step S11002, the CPU 1002 searches for a color patch in the ready-made standard color chart, which matches the extracted color element data (their numerical values are equal to each other) The detailed processing of step S11002 will be described later using FIG. 12.

In step S11003, the CPU 1002 stores the extracted color patch information in the storage medium (i.e., it makes the storage medium store the color patch information). The process then advances to step S11004, and the CPU 1002 deletes redundant color patch information of those stored in the storage medium.

The process advances to step S11005, and the CPU 1002 sorts the color patches as chart data in the order of IDs. As the sorting method, for example, if the ready-made color chart has ID numbers, the CPU 1002 sorts data according to these numbers; if the ready-made color chart does not have any ID numbers, it sorts data in the order of hues.

[Processing for Searching for Color Patch: FIG. 12]

Figure 12:
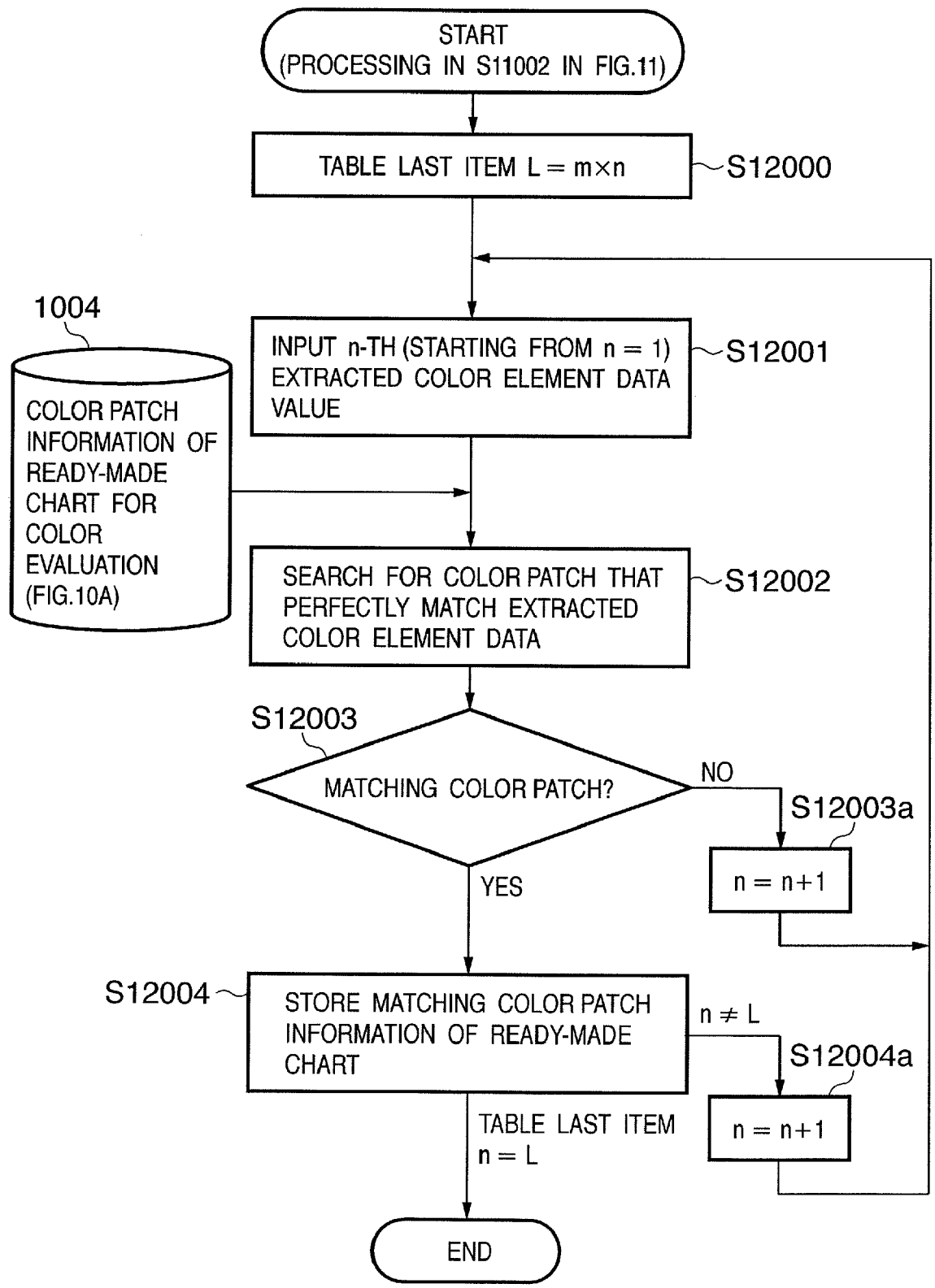
FIG. 12 is a flowchart for explaining details (first embodiment) of extraction processing in step S11002 in FIG. 11.

FIG. 12 is a flowchart for explaining details of the processing for searching for a color patch in step S11002 in FIG. 11.

In step S12000, the CPU 1002 sets a table last item L=m×n. Upon receiving the n-th (starting from n=1) extracted color element data value in step S12001, the process advances to step S12002. In step S12002, the CPU 1002 compares the n-th extracted color element data value with each color patch information of the ready-made standard color chart, and searches for a color patch that completely matches the extracted color element data.

The process advances to step S12003, and the CPU 1002 checks if a color patch that matches the color element data is found. If a color patch that matches the color element data is not found, the process advances to step S12003a to increment n by 1. The process then returns to step S12001 to examine the next item of the color gamut table.

If a color patch that matches the color element data is found in step S12003, the process advances to step S12004, and the CPU 1002 stores the extracted color patch information. After that, the process advances to step S12004a to increment n by 1, and then returns to step S12001 to examine the next item of the color gamut table. The CPU 1002 repeats this processing up to the last item L=m×n of the color gamut table. If redundant color patches are included in the stored color patch information, they are reduced to one.

Upon completion of the processing up to the last item L=m×n of the color gamut table in step S12004, the CPU 1002 sorts data in the order of IDs included in the ready-made standard color chart to create chart data, thus ending a series of processes.

Figure 14:
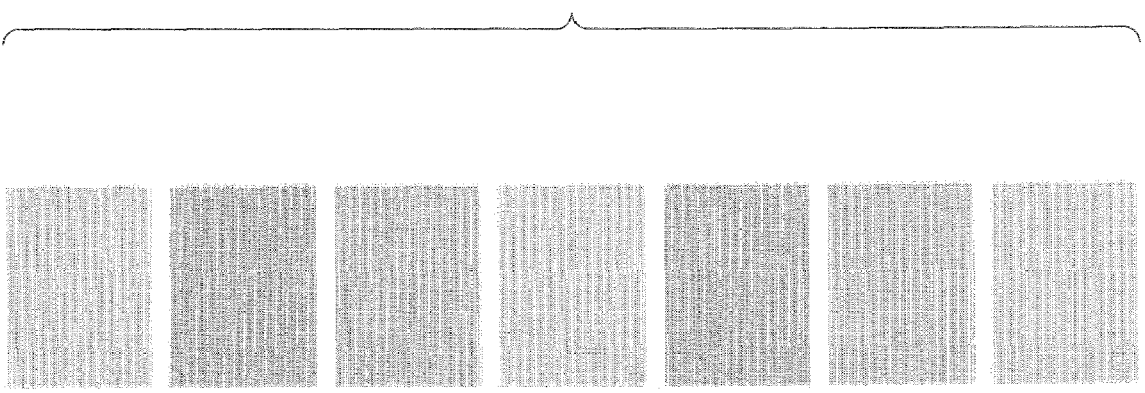
FIG. 14 shows an example of the extracted color chart for color evaluation corresponding to FIG. 13.

FIG. 13 shows an example of the color chart data extracted from the ready-made standard color chart by the above processing. FIG. 14 shows an example of a color chart corresponding to FIG. 13. In this case, 18 patches suited to color evaluation of the area (upper left area in FIG. 4) selected by the evaluator can be extracted and used from the JMPA color patches (382 patches) shown in FIG. 10A.

Thus, according to the creating apparatus of the present embodiment, when not all the colors need be checked like in a case wherein color evaluation is made within the evaluation area set by the evaluator and so forth, a color chart for color evaluation required for that evaluation area can be extracted from the ready-made standard color chart when it is used. Therefore, using the color chart for color evaluation created by the creating apparatus of a color chart for color evaluation, the measurement time can be shortened and color evaluation can be efficiently done compared to case using all the color patches of the ready-made standard color chart.

Second Embodiment

A description will be given of a creating method of a color chart for color evaluation according to the second embodiment. Note that the creating method of a color chart for color evaluation of this embodiment is similar to that using the creating apparatus 1000 of a color chart for color evaluation of the first embodiment. Therefore, a description of parts common to those described in the first embodiment will be omitted, and only different points will be explained hereinafter.

[Feature]

In the first embodiment, the evaluation area of an image selected by the evaluator is divided into a desired number of divisions (e.g., divided into m×n) as needed, and color element data are extracted for respective divided regions to create a color gamut table. The created color gamut table is compared with a ready-made standard color chart to extract and use only equal color patches as matching ones. However, the first embodiment often causes a case wherein the ready-made standard color chart includes no color patches that match the color gamut table.

Hence, the second embodiment compares the created color gamut table with the ready-made standard color chart, and if the ready-made standard color chart includes a color patch near the color element data of interest of the color gamut table, it extracts and uses that color patch as a matching one. For example, if the chromaticity difference between color element data of the color gamut table and a color patch near the color element data in the ready-made standard color chart is less than a given chromaticity difference (less than a threshold value Lt), a match is determined. Therefore, using the color chart for color evaluation extracted by the creating apparatus of a color chart for color evaluation, the measurement time can be shortened and color evaluation can be efficiently done compared to the case that uses all the color patches of the ready-made standard color chart.

Operation Example of Information Processing Apparatus in Second Embodiment

Figure 15:
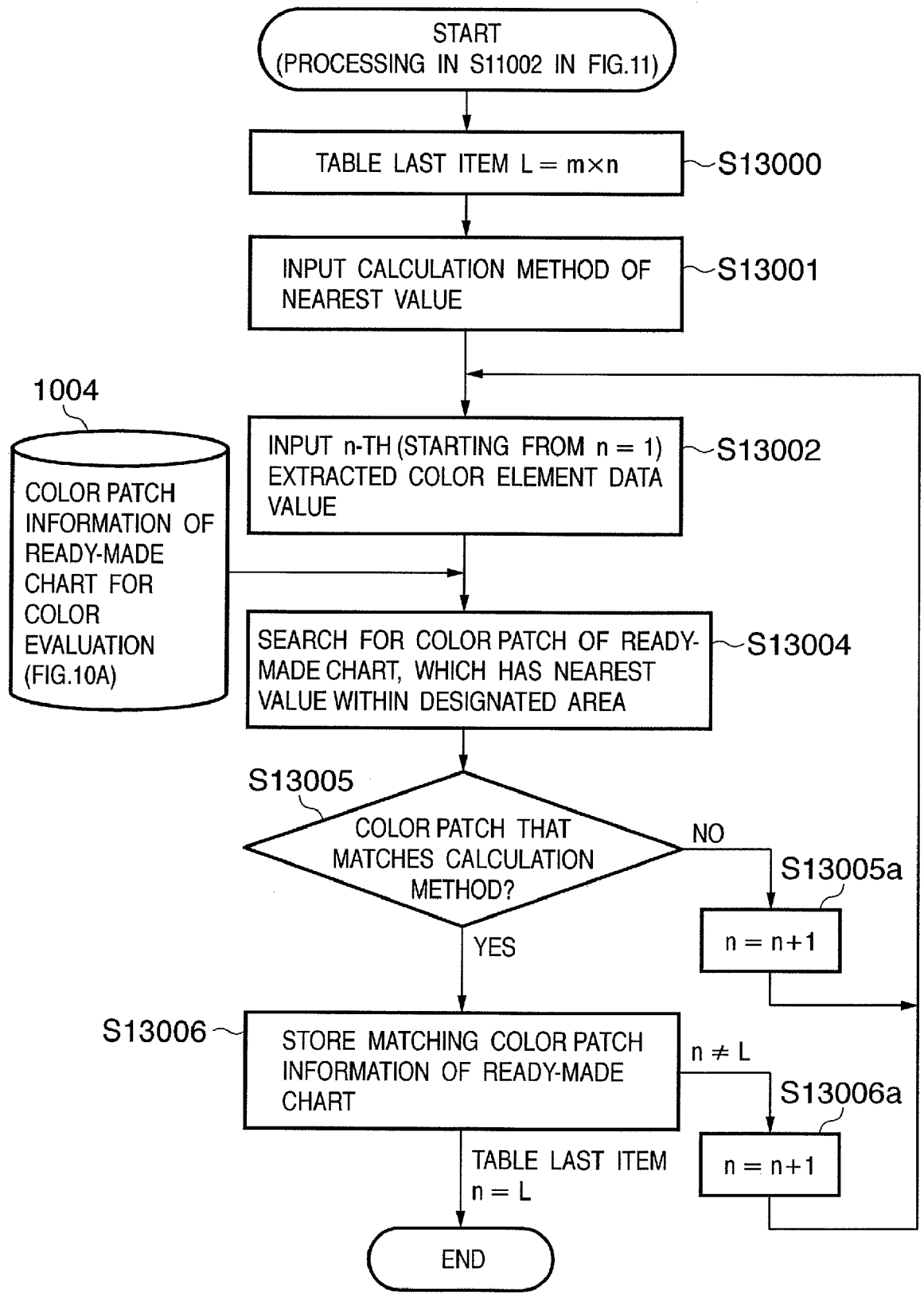
FIG. 15 is a flowchart for explaining details (second embodiment) of extraction processing in step S11002 in FIG. 11.

[Processing for Searching for Color Patch: FIG. 15]

FIG. 15 is a flowchart for explaining details of the processing for searching for a color patch in step S11002 in FIG. 11 described in the first embodiment.

Figure 16:
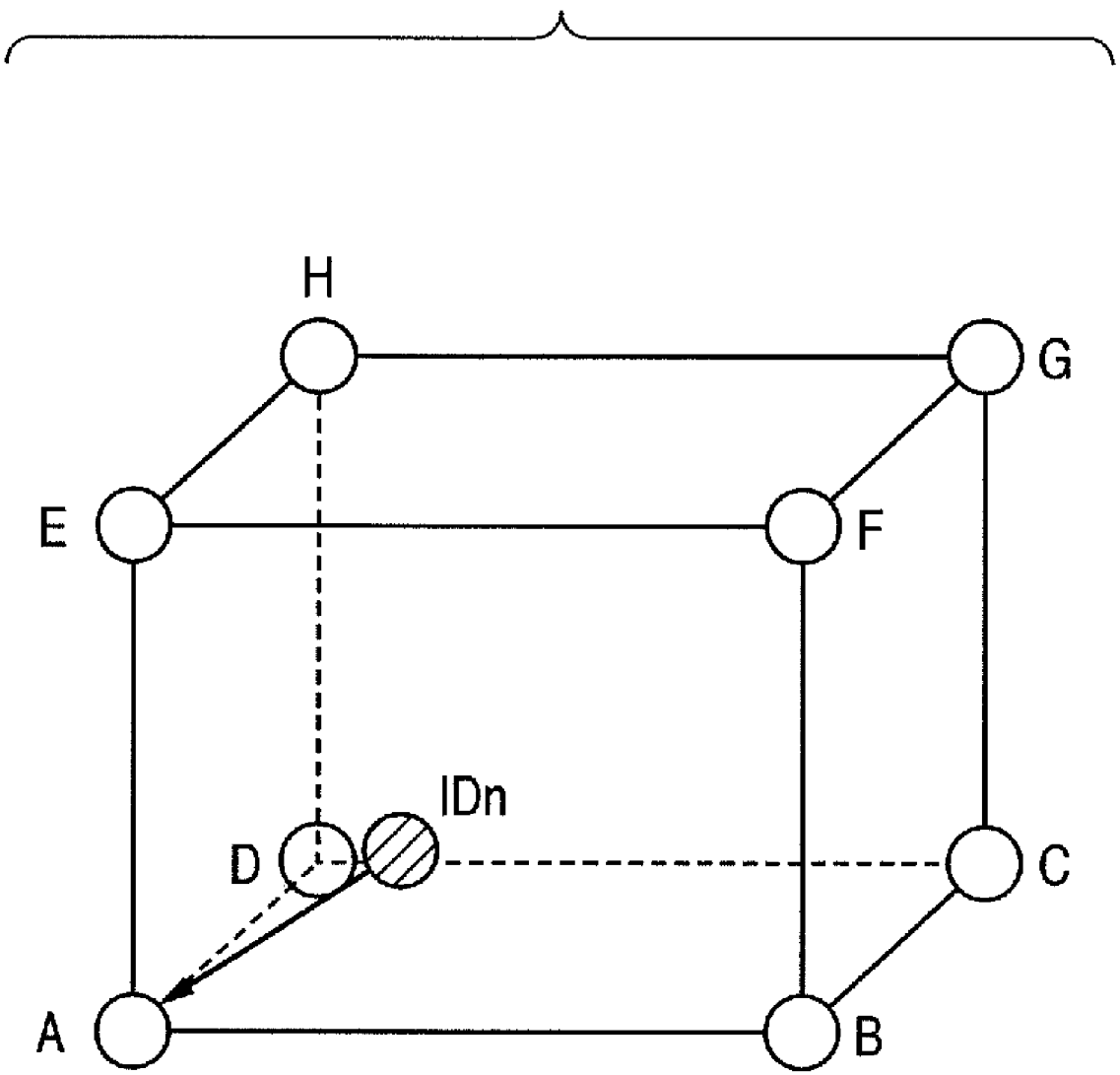
FIG. 16 is a view for explaining a method of computing the nearest values of a ready-made standard color chart from data of a color gamut table.

In the second embodiment, as shown in FIG. 16, whether or not the data of the color gamut table matches a color patch (IDn) of the ready-made standard color chart is determined by examining whether or not the chromaticity difference between the two color element data is less than a threshold value Lt. For example, as shown in FIG. 16, if the chromaticity difference between data A of the color gamut table and a color patch (IDn) of the ready-made standard color chart is less than the threshold value Lt. IDn is extracted as a color patch that matches data A. If the chromaticity difference between data of the color gamut table and a color patch (IDn) of the ready-made standard color chart is larger than the threshold value Lt, no color patch is extracted since there is no color patch that matches the data of the color gamut table.

In step S13000, the table last item L=m×n is given. In step S13001, a calculation method of a nearest value is input.

Upon receiving the n-th (starting from n=1) extracted color element data value in step S13002, the process advances to step S13004. In step S13004, the CPU 1002 searches for a color patch which assumes a nearest value with respect to the designated area. That is, the CPU 1002 searches for a color patch of the ready-made standard color chart, which has the nearest chromaticity value to the n-th extracted color element data.

The process advances to step S13005 to check if there is a color patch that matches the calculation method input in step S13001. More specifically, if the chromaticity difference between two points, i.e., the n-th extracted color element data and a color patch of the ready-made standard color chart, which has the nearest chromaticity value to that color element data is larger than the threshold value Lt in step S13005, the CPU 1002 determines that they do not match (are not equal), and does not extract that color patch. The process advances to step S13005a to increment n by 1, and the process returns to step S13002.

On the other hand, if the chromaticity difference between two points, i.e., the n-th extracted color element data and a color patch of the ready-made standard color chart, which has the nearest chromaticity value to that color element data is less than the threshold value Lt in step S13005, the CPU 1002 determines that they match (equal to each other), and the process advances to step S13006. In step S13006, the CPU 1002 stores the color patch which is determined to coincide (match) with the color element data in step S13005. The process advances to step S13006a to increment n by 1, and returns to step S13002. The CPU 1002 repeats this processing up to the last item L=m×n of the color gamut table. If redundant color patches are included in the stored color patch information, they are reduced to one.

Upon completion of the processing up to the last item L=m×n of the color gamut table in step S13006, the CPU 1002 sorts data in the order of IDs included in the ready-made standard color chart to create chart data, thus ending a series of processes.

Figure 18:
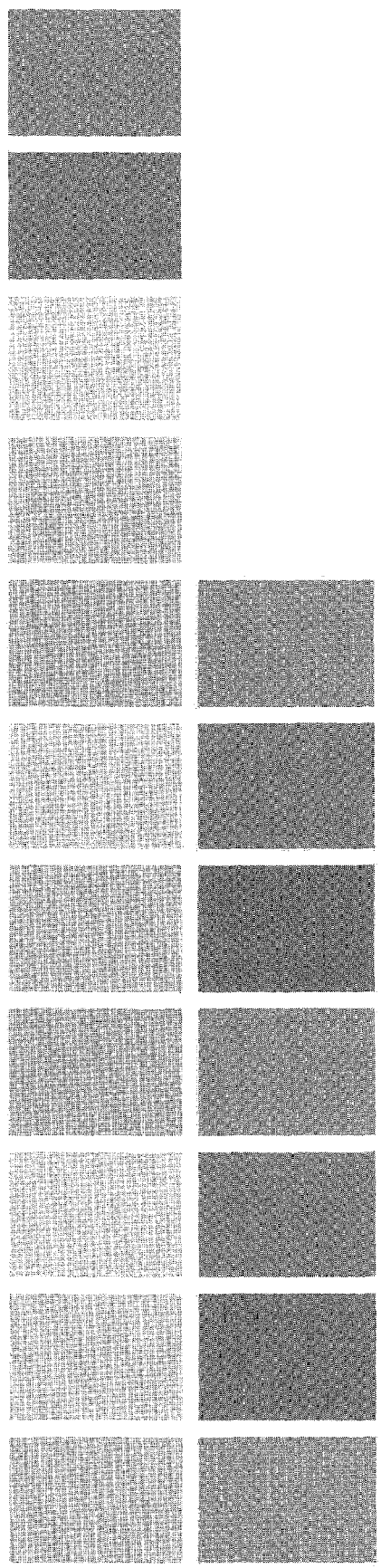
FIG. 18 shows an example (second embodiment) of the extracted color chart for color evaluation corresponding to FIG. 17.

FIG. 17 shows an example of the color chart data extracted from the ready-made standard color chart by the aforementioned processing. FIG. 18 shows an example of a color chart corresponding to FIG. 17. In this case, seven patches suited to color evaluation of the area (upper left area in FIG. 4) selected by the evaluator can be extracted and used from the JMPA color patches (382 patches) shown in FIG. 10A.

Thus, according to the creating apparatus of the present embodiment, when not all the colors need be checked like in a case wherein color evaluation is made within the evaluation area set by the evaluator and so forth, a color chart for color evaluation required for that evaluation area can be extracted from the ready-made standard color chart when it is used. Therefore, using the color chart for color evaluation created by the creating apparatus of a color chart for color evaluation, the measurement time can be shortened and color evaluation can be efficiently done compared to the case that uses all the color patches of the ready-made standard color chart.

Third Embodiment

In the first and second embodiments, a color chart for color evaluation is created from a setting region of an evaluation target image which is to undergo color evaluation. However, the third embodiment uses a chromaticity diagram shown in FIG. 19 as an image required to create a color chart for color evaluation. Note that the creating method of a color chart for color evaluation according to the third embodiment is the same as that in the first and second embodiment, and a repetitive description thereof will be avoided.

In the third embodiment, a rectangular area exemplified in FIG. 19 is set as the evaluation area set by the evaluator. According to the third embodiment, a color chart for color evaluation, which is free from any bias due to the feature of an image used to create a color chart for color evaluation unlike in the first and second embodiments, and represents the rectangular area of the chromaticity diagram can be created.

As described above, according to the present invention, there are provided a creating method of a color chart for color evaluation, which can easily and quickly create a color chart for color evaluation required for color evaluation within the evaluation area set by the evaluator, and an information processing apparatus thereof.

Other Embodiments

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, magneto-optical disk, CD-ROM, CD-R, and CD-RW may be used. Also, DVD-ROM, DVD-RAM, DVD-RW, DVD+RW, magnetic tape, nonvolatile memory card, ROM, and the like may be used. Or program codes may be downloaded via a network.

The functions of the above-mentioned embodiments are implemented by executing the readout program code by the computer. However, in addition, the present invention also includes the following case: an OS (operating system) running on the computer executes some or all of actual processing operations on the basis of an instruction of the program code to implement the functions of the above-mentioned embodiments.

Furthermore, the present invention includes the following case. That is, the program code read out from the storage medium is written in a memory of an extension board or unit, which is inserted in or connected to the computer. Then, a CPU or the like arranged in the function extension board or unit executes some or all of actual processing operations to implement the functions of the above-mentioned embodiments.

In this case, the program is supplied directly from the storage medium that stores the program or by downloading the program from another computer, database, or the like (none of them are shown) connected to the Internet, commercial network, local area network, or the like.

The form of program may be an object code, a program to be executed by an interpreter, script data to be supplied to an OS, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-029003 filed on Feb. 6, 2006, which is hereby incorporated by reference herein in its entirety.

What is claimed is:

1. A method of creating a color chart for color evaluation used in color evaluation, comprising:

an obtaining step of obtaining standard color chart data corresponding to a standard color chart including a plurality of color patches;

a first display step of displaying an image on a display screen;

a setting step of setting an area in the displayed image, which is used to create a color chart for color evaluation;

a computing step of computing a color element which represents color features of an image within the set area based on image data of the set area;

a creating step of creating the color chart for color evaluation by extracting patch data corresponding to the computed color element from the standard color chart data; and a second display step of displaying the created color chart for color evaluation on one display screen, wherein the computing step comprises:

a dividing step of dividing the set area into regions each having a predetermined size; and a selecting step of selecting a color element which represents each of the divided regions, and the creating step creates the color chart for color evaluation by which the number of patches is reduced by extracting patch data corresponding to the color element selected from the divided regions from the standard color chart data.

2. The method according to claim 1, wherein the image displayed in the first display step is an image for evaluation target.

3. The method according to claim 1, wherein the image displayed in the first display step is a chromaticity diagram.

4. The method according to claim 1, wherein the selecting step selects a color element of a central pixel included in each of the divided regions as the color element which represents that region.

5. The method according to claim 1, wherein the selecting step selects a color element of an average value of pixels included in each of the divided regions as the color element which represents that region.

6. The method according to claim 1, wherein the setting step sets the area used to create the color chart for color evaluation from the displayed image using a pointing device.

7. The method according to claim 1, wherein the selecting step obtains chromaticity information from the color element which represents each of the divided regions, and selects patch data having a chromaticity difference with the chromaticity information which is less than a threshold value from the standard color chart data.

8. An information processing apparatus for creating a color chart for color evaluation used in color evaluation, comprising:
- an obtaining unit adapted to obtain standard color chart data corresponding to a standard color chart including a plurality of color patches;
- a first display unit adapted to display an image on a display screen;
- a setting unit adapted to set an area in the displayed image, which is used to create a color chart for color evaluation;
- a computing unit adapted to compute a color element which represents color features of an image within the set area based on image data of the set area;
- a creating unit adapted to create the color chart for color evaluation by extracting patch data corresponding to the computed color element data from the standard color chart data: and
- a second display unit adapted to display the created color chart for color evaluation on one display screen,
- wherein the computing means comprises:
- a dividing unit adapted to divide the set area into regions each having a predetermined size; and
- a selecting unit adapted to select a color element which represents each of the divided regions, and
- the creating unit creates the color chart for color evaluation by which the number of patches is reduced by extracting patch data corresponding to the color element selected from the divided regions from the standard color chart data.

9. The apparatus according to claim 8, wherein the selecting unit obtains chromaticity information from the color element which represents each of the divided regions, and selects patch data having a chromaticity difference with the chromaticity information which is less than a threshold value from the standard color chart data.

10. A computer readable storage medium which stores a control program, wherein the control program causes a computer to execute each step of a control method of an information processing apparatus for creating a color chart for color evaluation used in color evaluation, the method comprising:
- an obtaining step of obtaining standard color chart data corresponding to a standard color chart including a plurality of color patches;
- a first display step of displaying an image on a display screen;
- a setting step of setting an area in the displayed image, which is used to create a color chart for color evaluation;
- a computing step of computing a color element which represents color features of an image within the set area based on image data of the set area;
- a creating step of creating the color chart for color evaluation by extracting patch data corresponding to the computed color element from the standard color chart data; and
- a second display step of displaying the created color chart for color evaluation on one display screen,
- wherein the computing step comprises:
- a dividing step of dividing the set area into regions each having a predetermined size; and
- a selecting step of selecting a color element which represents each of the divided regions, and
- the creating step creates the color chart for color evaluation by which the number of patches is reduced by extracting patch data corresponding to the color element selected from the divided regions from the standard color chart data.

* * * * *